United States Patent
Willner et al.

(10) Patent No.: US 7,035,538 B2
(45) Date of Patent: Apr. 25, 2006

(54) MONITORING OPTICAL DISPERSION BASED ON VESTIGIAL SIDE BAND OPTICAL FILTERING

(75) Inventors: Alan E. Willner, Los Angeles, CA (US); Qian Yu, Los Angeles, CA (US); Zhongqi Pan, Los Angeles, CA (US); Lianshan Yan, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 10/191,758

(22) Filed: Jul. 8, 2002

(65) Prior Publication Data

US 2003/0123884 A1 Jul. 3, 2003

Related U.S. Application Data

(60) Provisional application No. 60/304,221, filed on Jul. 9, 2001.

(51) Int. Cl.
*H04B 10/08* (2006.01)
*H04B 17/00* (2006.01)

(52) U.S. Cl. ..................................................... 398/29
(58) Field of Classification Search ............... 356/73.1; 398/29, 208–209, 81
See application file for complete search history.

(56) References Cited

U.S. PATENT DOCUMENTS

| | | | |
|---|---|---|---|
| 6,144,450 A | 11/2000 | Jopson et al. | |
| 6,154,273 A | 11/2000 | Suzuki | |
| 6,359,716 B1 * | 3/2002 | Taylor | 398/212 |
| 6,362,874 B1 | 3/2002 | Madsen | |
| 6,407,805 B1 | 6/2002 | Sorin | |
| 6,407,846 B1 * | 6/2002 | Myers et al. | 359/239 |
| 6,456,422 B1 * | 9/2002 | Hayes et al. | 359/325 |
| 6,459,830 B1 * | 10/2002 | Pua et al. | 385/24 |
| 6,573,985 B1 * | 6/2003 | Ibukuro et al. | 356/73.1 |
| 2002/0018213 A1 | 2/2002 | Ibukuro et al. | |
| 2002/0044322 A1 | 4/2002 | Blumenthal et al. | |
| 2002/0093643 A1 * | 7/2002 | Moeller | 356/73.1 |

OTHER PUBLICATIONS

Madsen, "Chromatic and Polarization Mode Dispersion Measurement Technique using Phase-Sensitive Sideband Detection", *Optical Fiber Communication Conference*, pp. M06-1 to M06-3, Mar. 17-22, 2001.

Dimmick, et al., "Optical Dispersion Monitoring Technique Using Double Sideband Subcarriers", *IEEE Photonics Technology Letters*, vol. 12, No. 7, pp. 900-902, Jul. 2000.

* cited by examiner

*Primary Examiner*—Jason Chan
*Assistant Examiner*—Shi K. Li
(74) *Attorney, Agent, or Firm*—Fish & Richardson P.C.

(57) ABSTRACT

Techniques for monitoring frequency-dependent parameter and optical property such as optical dispersion in a modulated optical signal with sidebands based on optical vestigial sideband filtering. Monitoring implementations for both chromatic dispersion and polarization-mode dispersion are described as examples.

18 Claims, 10 Drawing Sheets

FIG. 3 optically filtering a modulated optical signal at a carrier frequency that has two sidebands at opposite sides of the carrier frequency to produce a first optical signal which spectrally covers first sideband and the carrier frequency without covering the entirety of the second sideband and a second optical signal which spectrally covers second sideband and the carrier frequency without covering the entirety of the first sideband

↓ extracting first phase of the first optical signal

↓ extracting second phase of the second optical signal

↓

Obtaining a phase difference between and the first phase and the second phase

↓

Extracting information of a chromatic dispersion of the modulated optical signal based on the phase difference and the frequency difference in the center optical frequencies of the first and the second optical signals

MONITORING OPTICAL DISPERSION BASED ON VESTIGIAL SIDE BAND OPTICAL FILTERING

This application claims the benefit of U.S. Provisional Application No. 60/304,221 filed on Jul. 9, 2001, the entire disclosure of which is incorporated herein by reference as part of this application.

Federally Sponsored Research or Development

This invention was made with government support under Contract No. F30602-98-1-0196 awarded by the Air Force. The government has certain rights in the invention.

BACKGROUND

This application relates to optical dispersion, and more specifically, to techniques for monitoring and controlling optical dispersion in optical media and transmission systems, including optical fiber links and optical wavelength-division multiplexing (WDM) fiber systems.

Many optical media exhibit various dispersion effects such as chromatic dispersion or polarization-mode dispersion (PMD). In chromatic dispersion, optical signals or spectral components with different wavelengths travel at different group velocities. Hence, the refractive index of an optical medium with chromatic dispersion changes its value with wavelength. The polarization-mode dispersion occurs in birefringent optical media which exhibit different refractive indices for light with different polarizations along two orthogonal principal directions. Therefore, an optical signal, that comprises two components along the two orthogonal principal directions for each frequency, can be distorted after propagation through the transmission medium since the two components propagate in different group velocities. This polarization-mode dispersion can cause different polarization components, even at the same wavelength, to travel at different group velocities.

Optical fibers are widely used in transmission and delivery of optical signals from one location to another in a variety of optical systems, including but not limited to fiber links and fiber networks for data communications and tele-communications. Dispersion effects, such as chromatic dispersion and polarization-mode dispersion, may cause various effects in optical fibers. For example, dispersion may distort optical pulses and hence cause noise, errors, or performance degradation in optical communication systems. More specifically, dispersion can cause the pulse broadening and thus limit the transmission bit rate, the transmission bandwidth, and other performance factors of an optical communication system. These and other effects of the optical dispersion are undesirable, especially in fiber systems to transmit bit rates higher than 10 Gbit/s over long distances such as 100 km.

It is therefore desirable to measure and monitor the optical dispersion in an optical medium in order to control or manage the effects of the optical dispersion.

SUMMARY

This application describes dispersion monitoring techniques by measuring the phase difference of two sideband signals in a modulated optical signal. Other frequency-dependent parameter or property may also be measured based on the disclosed techniques.

BRIEF DESCRIPTION OF THE DRAWINGS

FIG. 3 shows one embodiment of a dispersion monitoring based on the optical VSB filtering.

DETAILED DESCRIPTION

Figure 1A:
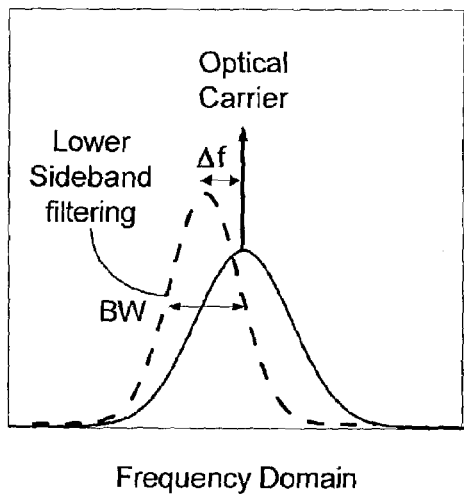
FIGS. 1A and 1B illustrate optical vestigial side band (VSB) filtering used in the dispersion monitoring techniques of this application.

The techniques of this application in general include the following in processing a modulated optical signal at a carrier frequency that has first and second sidebands at opposite sides of the carrier frequency. First, the modulated optical signal is optically filtered to produce a first optical signal having a first spectral range that covers said first sideband and a second optical signal having a second, different spectral range that covers said second sideband. Next, measurement of a parameter from said first optical signal is carried out to obtain a first result. Similarly, the same parameter from said second optical signal is measured to obtain a second result. Subsequently, a difference between said first and said second results is obtained and is used to extract frequency-dependent information in said modulated optical signal. Such techniques are useful in extracting frequency-dependent information in such modulated optical signals because the two sidebands carry essentially the same information and may be applied in a variety of applications as illustrated specifically in measuring and monitoring chromatic dispersion and PMD effects.

Compensation and control of fiber chromatic dispersion and polarization-mode dispersion (PMD) is one of important issues in high-bit-rate optical fiber communication systems (e.g., at 40 Gb/s and beyond). Since dispersion effects may change over time, it is desirable monitor the dispersion effects in real time in order to effectively control or reduce the dispersion effects. This application includes dispersion monitoring techniques by optically extracting two different sideband signals of a modulated optical signal to measure the phase information of the two sideband signals, respectively.

Modulated optical data generally have at least two sidebands in the frequency domain caused by temporal modulation of the optical carrier signal. The two sidebands carry essentially identical information. Because the sidebands are at different center frequencies, they undergo different chromatic dispersion effects when the signal transmits through a dispersive medium such as one or more optical fibers. Therefore, after transmitting through the dispersive medium, the two sideband signals have a relative time delay and thus a phase difference due to their different group velocities. The phase difference of two sideband signals thus may be used to infer the chromatic dispersion based on the frequency difference between the two sideband signals. This technique may be combined with a manipulation on the polarization of the modulated optical signal prior to the optical filtering to monitor PMD of the modulated optical signal. In addition, such dispersion monitoring techniques may be coupled to an adjustable dispersion compensator or an adjustable dispersion control element to dynamically control the dispersion in an optical signal.

In general, techniques and devices of this application may use at least one optical bandpass filter with a center frequency offset from the carrier frequency of the modulated optical signal to filter the modulated optical signal to obtain two filtered optical signals in two spectral ranges that respectively include the sidebands. The full spectral bandwidth at the half of the maximum of the optical bandpass filter may be approximately equal to the bit-rate of the modulated optical signal. In filtering the modulated optical signal to produce one of the two filtered optical signals, the center frequency of the filter is offset from the optical carrier frequency to transmit the center of one sideband signal and the optical carrier frequency while excluding the majority portion of the other sideband signal. However, some spectral components closer to the carrier frequency, i.e., a vestige, of the other sideband signal are within the transmission band of the filter and thus appear in the filtered optical signal. For this reason, this optical filtering is referred herein as vestigial side band (VSB) filtering. The other filtered optical signal is also produced by a similarly VSB filtering on the opposite side of the optical carrier frequency.

Figure 1B:
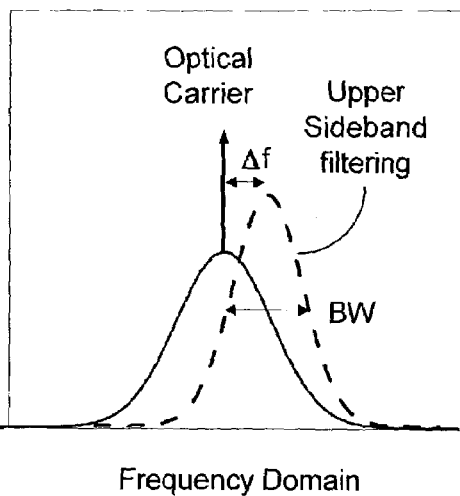

FIGS. 1A and 1B illustrate VSB filtering on the upper and lower sides of the optical carrier frequency of the modulated optical signal to produce the two sideband signals, where the bandwidth of the filter is BW and the detuning of the center frequency of the filter from the optical carrier frequency is Δf. For example, the frequency detuning Δf may be selected to be approximately between 30% and 80% of the bit-rate of the modulated signal to achieve the desired VSB filtering.

Figure 2A:
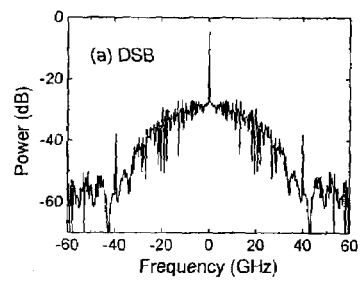
FIGS. 2A, 2B, and 2C show an example of VSB filtering of an optical signal modulated at 40 Gb/s.
Figure 2B:
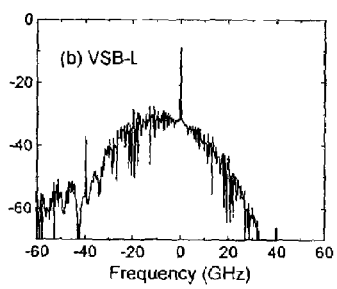
Figure 2C:
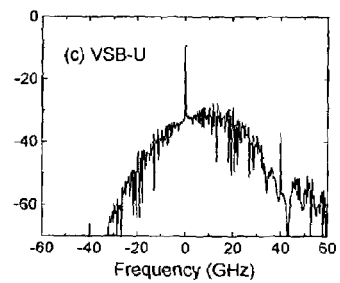

FIG. 2A shows a spectrum of an exemplary modulated optical signal in a 40-Gb/s system where the optical pulses are in the non-return-zero (NRZ) format. The two sidebands are centered on opposite sides of the optical carrier frequency with a frequency offset at about 40 GHz. FIGS. 2B and 2C show spectra of the lower and upper filtered optical signals by VSB filtering of the modulated signal in FIG. 2A. The two filtered optical signals are then processed to extract phase information unique to each signal. This may be achieved, in one implementation, by first recovering the clock signal in each filtered optical signal and then extracting the phase from the clock signal. Next, the difference of phase values of the two clock signals is used to obtain information on the chromatic dispersion present in the modulated optical signal.

FIG. 3 shows one operation flow for monitoring the chromatic dispersion based on the VSB optical filtering of the same modulated optical signal. In one implementation, each filtered optical signal may be first converted into an electrical signal and the electrical signal is then processed to electronically to recover the clock signal. Each clock signal is then processed to extract the phase information.

The optical filtering may be carried out by either directly filtering the input modulated optical signal or filtering a monitoring signal that is tapped out of the input modulated optical signal. The VSB filtering for producing the two filtered optical signals may be obtained either simultaneously or sequentially. In simultaneous filtering, an optical splitter is used to split the input signal, which may be the tapped monitoring signal, into two signals. Two VSB bandpass filters centered on opposite sides of the optical carrier frequency are then used to filter the two signals at the same time, respectively. In sequential filtering, a tunable bandpass filter is positioned in the input signal or the tapped monitoring signal and is controlled to shift the center frequency of the transmission band to the desired spectral positions in the lower and upper sides of the carrier frequency sequentially to obtain two different filtered optical signals at different times. It is assumed that, the optical dispersion does not change substantially during the period between the two filtering operations so that the phase difference between the two filtered signals reflects the phase change caused by the chromatic dispersion due to the frequency difference in the two filtered optical signals. As will be seen in the following, the sequential filtering scheme based on a tunable filter is simpler in its structure in comparison to the simultaneous filtering.

Figure 4:
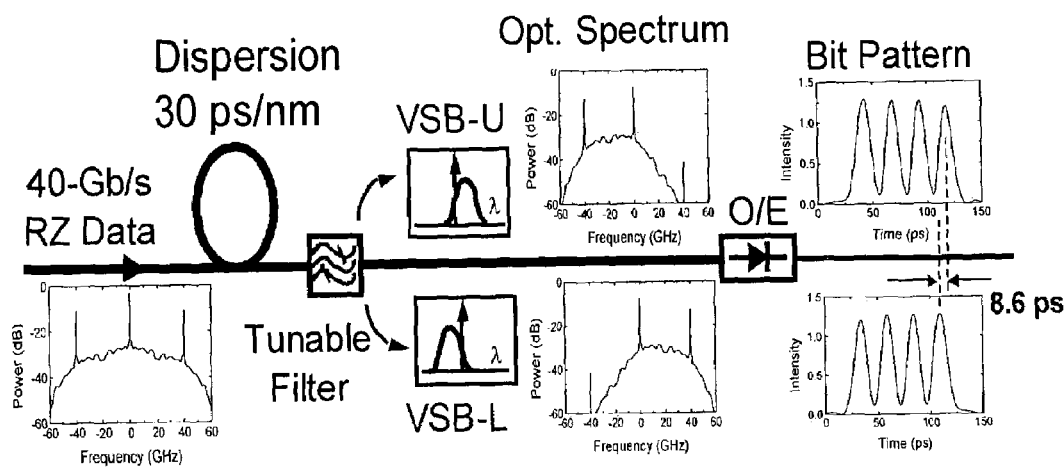
FIG. 4 illustrates an example of dispersion monitoring based on the sequential optical VSB filtering with a single tunable filter.

FIG. 4 further illustrates the above chromatic dispersion monitoring of an input RZ optical signal at 40-Gb/s. The signal is first sent through a dispersive fiber section with a chromatic dispersion at 30 ps/nm. The output signal is then sequentially filtered by a tunable VSB bandpass filter to obtain two filtered optical signals: VSB-U and VSB-L. The filter is a dispersion-free Gaussian filter with a frequency detuning of 24 GHz from the carrier frequency in filtering the two signals. After optical-to-electrical conversion, the two signals are processed to extract their clock signals. A phase detection is them performed to measure the phase difference which shows the relative delay is about 8.6 ps caused by dispersion over a frequency difference of 48 GHz.

Embodiments of dispersion monitoring devices based on the VSB filtering are described below.

Figure 5:
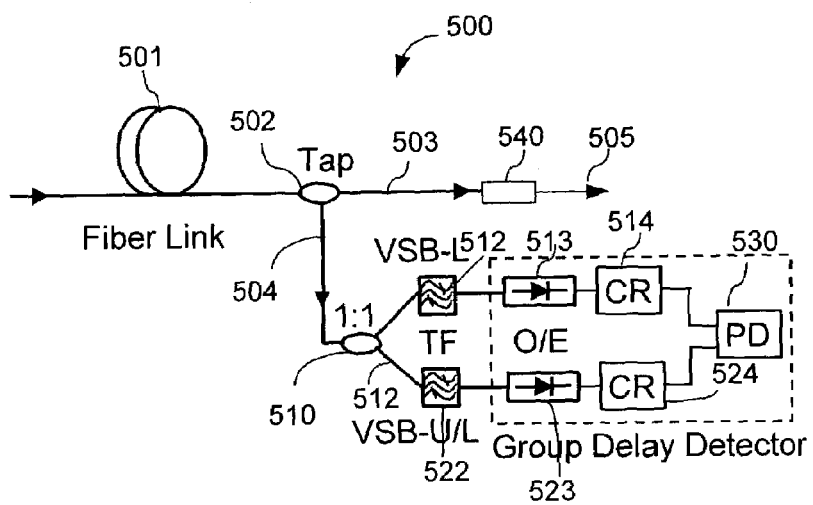
FIGS. 5, 6A, 6B, and 7 show embodiments of dispersion monitoring devices.

FIG. 5 shows a dispersion monitoring device 500 using the simultaneous filtering with two parallel processing paths. A dispersive optical link 501, such as a fiber link, is used to deliver an input modulated optical signal with two sidebands. An optical splitter (tap) 502 is coupled to split a small fraction of the input signal to produce a monitoring signal 504 which carries the same information as the input signal. The remaining signal 503 is sent to a designated location in the fiber system. Another optical splitter 510 is used to split the monitoring signal 504 into two signals 511 and 512 into two parallel signal paths. Each path includes a VSB filter (521 or 522), an optical detector (513 or 523), and an optional clock recovery (CR) circuit (514 or 524). A phase detector 530 is lo then coupled to the two parallel signal paths to receive the two output signals and operates to extract the phase difference of the two output signals. The clock recovery circuits 514 and 524 are optional because they are needed when the clock signals are weak. In certain signals, such as RZ signals, the clock signals are strong and thus the clock recovery may be eliminated. In NRZ signals, strong clock signals are present when the VSB filtering is carried out by detuning the filter from the optical carrier frequency by at least about 80% of the bit rage frequency. The transmission bands of the two optical filters are set at different spectral positions to respectively obtain the filtered VSB signals.

Notably, the above dispersion monitoring may be used for dynamic management or compensation of the dispersion. As shown in FIG. 5, an adjustable dispersion element 540 may be optionally placed in the optical path of the signal 503 to change the dispersion in the signal 503 to produce a signal 505 with modified dispersion in response to a control signal. A control unit, which produces the control signal to adjust the dispersion element 540, is coupled to receive the dispersion information based on the output of the phase detector 530 and operates to adjust the dispersion produced by the element 540 in response to the measured dispersion. The dispersion element 540 may be a tunable fiber Bragg grating, such as a chirped fiber Bragg grating.

Figure 6A:
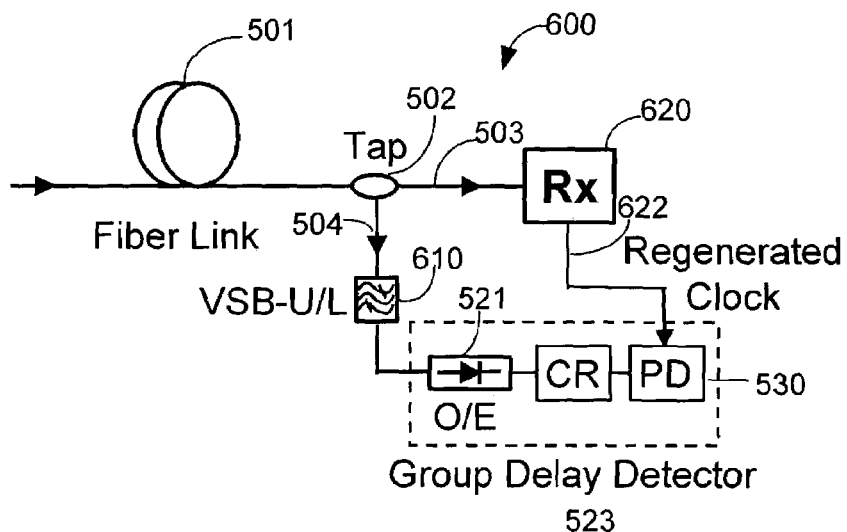

FIG. 6A shows another embodiment of a dispersion monitoring device 600 using the sequential filtering with a single processing path. A tunable filter 610 is placed in the path of the monitoring signal 504. The filtered signal is then sent into a group delay detector to measure its phase relative to a common regenerated clock signal 622. The group delay detector includes an optical detector 521, an optional clock recovery circuit 523, and a phase detector 530. Different from the device 500 in FIG. 5, a signal receiver 620 is used to receive a portion or the entirety of the signal 503 to produce the common regenerated clock signal 622. The phase values of the upper and lower VSB filtered signals are respectively compared to the reference phase of the common regenerated clock signal 622 to determine the phases of the upper and lower VSB filtered signals. The tunable filter 610 is tuned to, e.g., the lower side of the optical carrier frequency to obtain the lower VSB filtered signal. The phase detector 530 compares the phase of the lower VSB filtered signal with the phase of the clock signal 622 to determine the phase of the lower VSB filtered signal. Next, the tunable filter is tuned to the upper side of the optical carrier frequency to obtain the upper VSB filtered signal. The same processing is carried out to determine the phase of the upper VSB filtered signal. Finally, the phase difference between the lower and upper VSB filtered signals can be determined. As an option, the adjustable dispersion element 540 may be disposed between the tap 502 and the receiver 620 to provide a dynamic control of the dispersion in the signal 503 based on the measured dispersion.

Figure 6B:
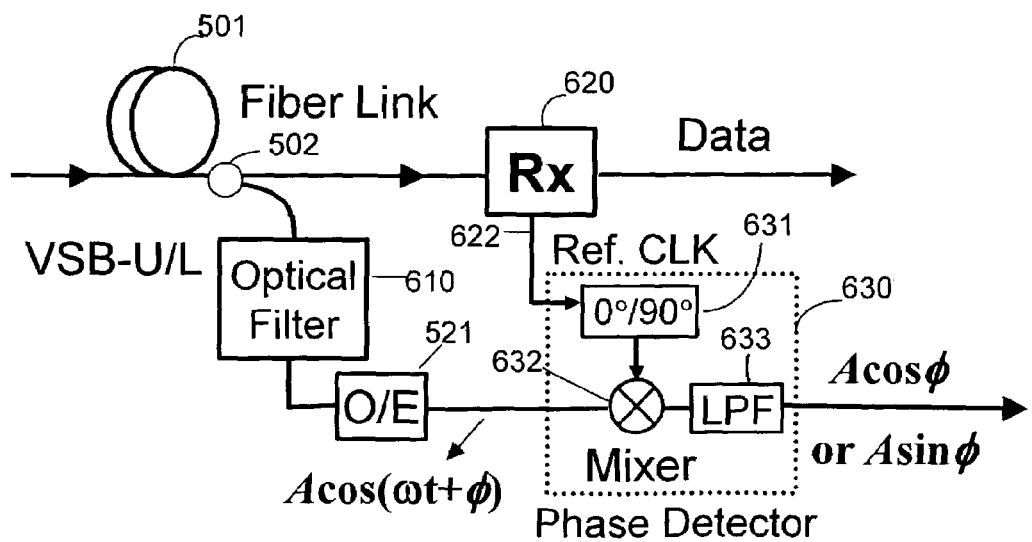

FIG. 6B shows one implementation of the phase detector 630 for the device 600 in FIG. 6A. The phase detector 630 includes a phase shifter 610 in the signal path of the reference clock signal 622, a signal mixer 632, and a low-pass filter 633. The phase shifter 610 changes the phase of the reference clock signal 622 by 90 degrees to perform two mixing at the mixer 632: one with the phase change of 90 degrees in the reference clock signal 622 and another one without the phase change. Thus, both the amplitude and the phase of the clock in the VSB signals can be determined from detecting the in-phase and in-quadrature amplitudes using a microwave mixer 632. The clock amplitude can be used to distinguish small and large dispersion, and hence extend the dynamic range of the dispersion monitor. In addition, a first-order PMD effect may influence the clock amplitude, but not the phase shift between the two sidebands.

The above dispersion monitoring devices may be used to provide a multi-wavelength chromatic dispersion monitoring in optical WDM or dense WDM systems. In the monitoring device 500 shown in FIG. 5, the two filters 512 and 522 may be tunable to scan through all WDM channels. At each WDM channel, the two filters 512 and 522 are operated at the lower and upper spectral portions of the signal to monitor the dispersion at each channel. Hence, the filters 512 and 522 can be tuned to monitor one channel at a time and different channels at different times. In the monitoring device 600 in FIG. 6A, the single filter 610 may be tuned to scan through all WDM channels to monitor the dispersion of one channel at a time. In monitoring a selected channel, the filter 610 is first tuned to, e.g., the lower side of the optical carrier to get the lower VSB filtered signal and then is tuned to the upper side of the optical carrier to get the upper VSB filtered signal. After completion of the current channel, the filter 610 is then tuned to another channel to repeat the operations for monitoring the dispersion.

Figure 7:
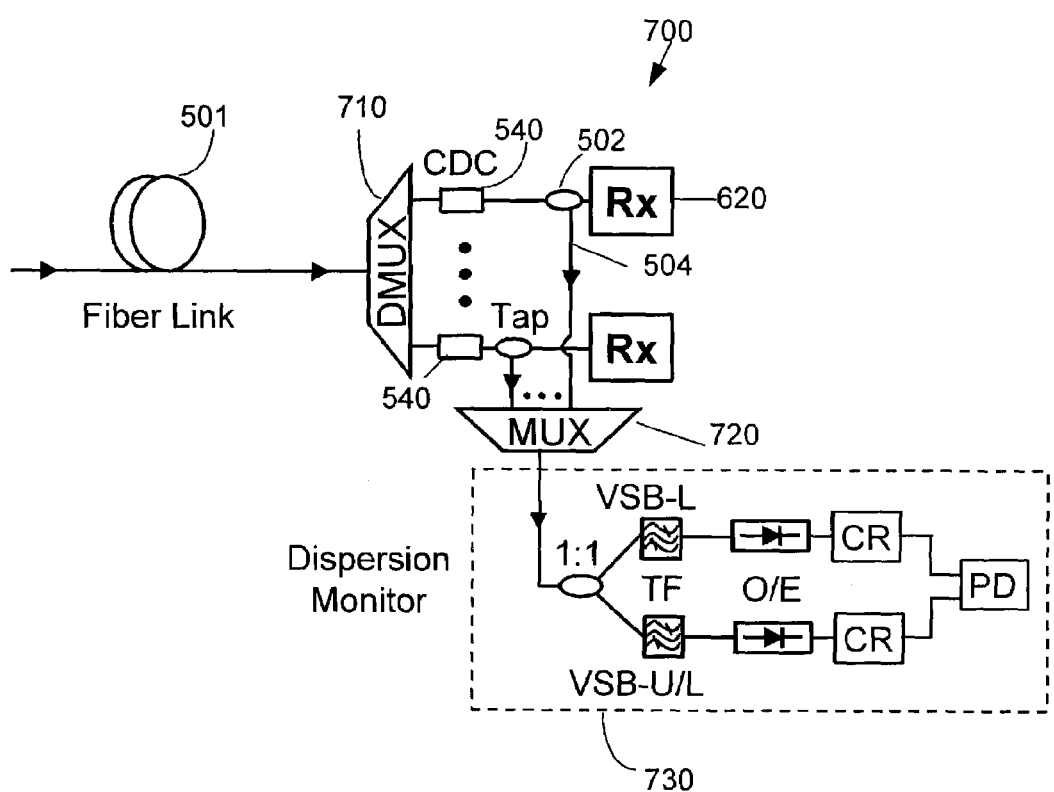

Alternatively, the chromatic dispersion monitoring may be implemented in another configuration 700 shown in FIG. 7. A WDM demultiplexer 710 is used to separate the input WDM channels into different optical paths. Each path is implemented with an optical tap splitter 520 to produce a channel monitoring signal 504 so that multiple channel monitoring signals 504 are produced. A WDM multiplexer 720 may be used to combine multiple channel monitoring signals 504 into a single optical path leading to a chromatic dispersion monitoring module 730. The module 730 may be implemented with tunable filters based on the design in FIG. 5 as illustrated or the design in FIG. 6A. In operation, the each filter in the module 730 is tuned to scan over the WDM channels to monitor one channel at a time. The adjustable dispersion element 540 may be optionally placed in each WDM channel between the demultiplexer 710 and the respective receiver 620 to provide dynamic dispersion control based on the measured dispersion from the module 730.

Figure 8A:
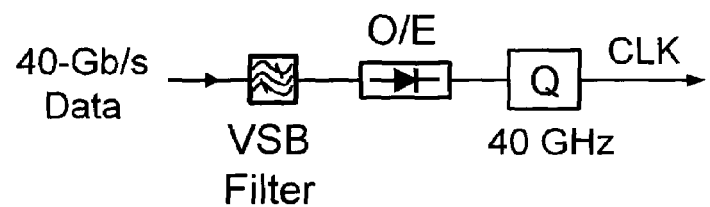
FIGS. 8A, 8B, and 8C show exemplary implementations of the clock recovery schemes.
Figure 8B:
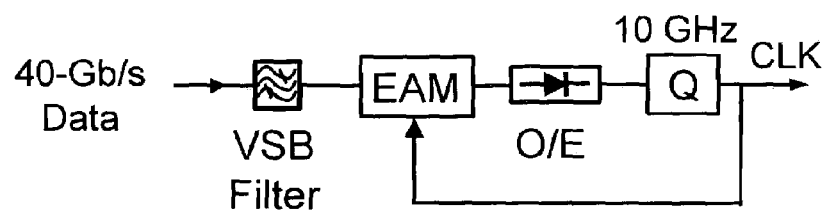
Figure 8C:
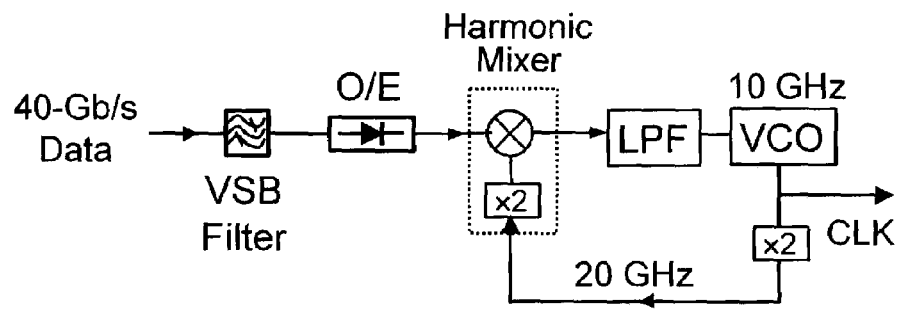

Various clock recovery schemes may be used in the above embodiments. One simple approach for clock recovery is filtering out the bit-rate frequency component directly from the photo-detected signal using a high-Q microwave filter, as shown in FIG. 8A. In general, a RZ signal has strong clock component. Even a NRZ signal contains the bit-rate frequency component with high spectral purity after vestige-sideband optical filtering with proper VSB bandwidth, e.g., about 80% of the bit-rate of the input signal. The clock component may be also extracted using a voltage-controlled oscillator and a phase-locked loop, as shown in FIG. 8B, in which the recovered clock frequency can be a fraction of the bit-rate, for example, 10-GHz clock for 40-Gb/s data. Many clock recovery techniques for optical time division multiplexed (OTDM) transmission can also be employed for this purpose. For example, FIG. 8C shows a clock recovery module using an electro-absorption modulator (EAM). This method can be readily scaled to 160-Gb/s systems.

Figure 9A:
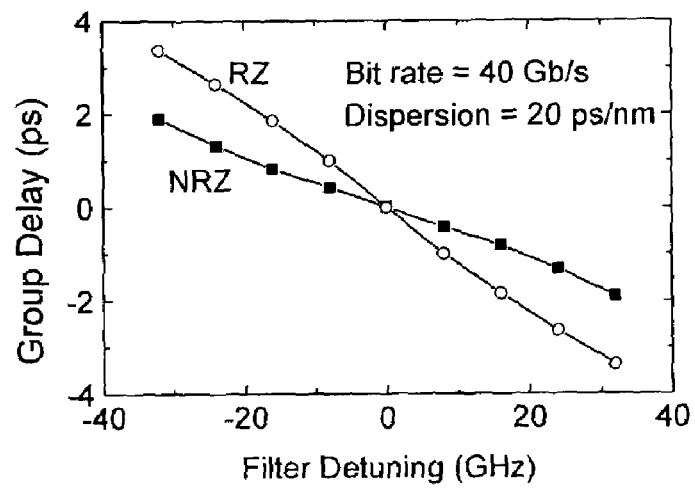
FIGS. 9A, 9B, 9C, 9D, and 9E show simulation results of the dispersion monitoring device in FIG. 6A.

The proposed dispersion monitoring techniques have been validated from modeling for 40-Gb/s PRBS data. In the modeling, it is assumed that the tunable filters used for VSB filtering have a Gaussian-shaped passband with a 3-dB bandwidth equal to 36 GHz. First, using the setup shown in FIG. 6A, the group delay variation versus the filter frequency detuning is observed at a typical chromatic dispersion value of about 20 ps/nm. FIG. 9A shows that the group delay varies approximately linearly with the filter center frequency. The slope of this linear relation is determined by chromatic dispersion.

Figure 9B:
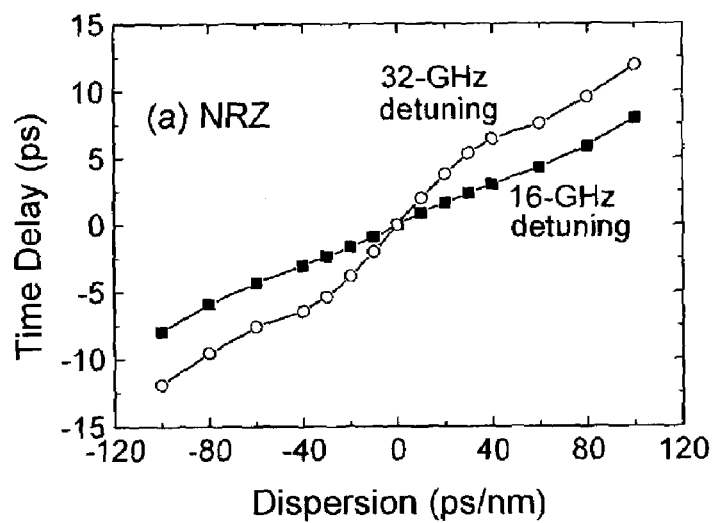
Figure 9C:
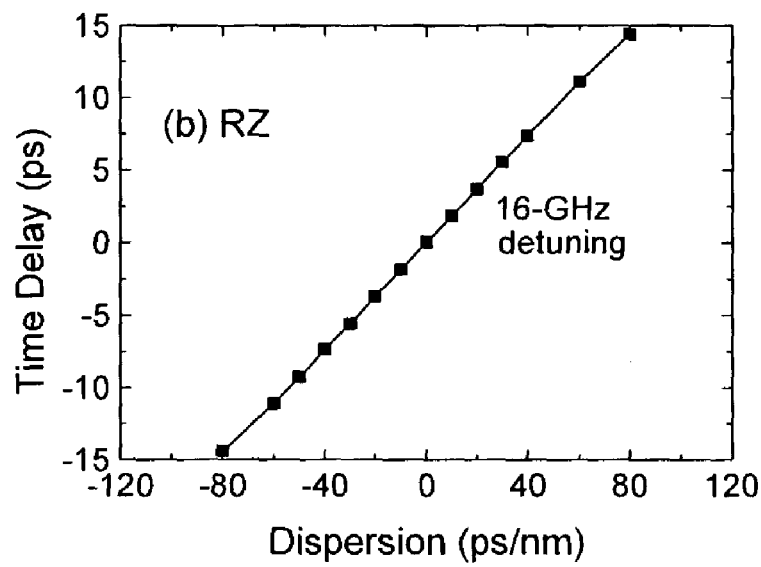
Figure 9D:
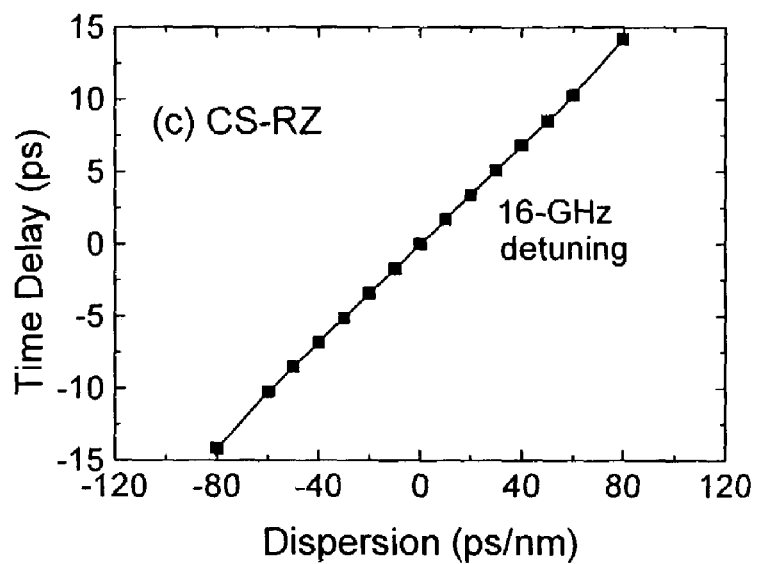

FIGS. 9B, 9C, and 9D show the relative time delay between the upper and lower VSB signals as a function of link chromatic dispersion for 40-Gb/s optical data using NRZ, conventional RZ, and carrier-suppressed RZ formats, respectively. The VSB filter is detuned from optical-carrier frequency ±16 or ±32 GHz. The chromatic dispersion within a broad range from −100 to 100 ps/nm can be measured. We note that the tolerance to chromatic dispersion for 40-Gb/s data is no more than ±60 ps/nm. The dispersion monitoring sensitivity is estimated to be better than 1.5 ps/nm, under the assumption that resolution of phase-sensitive detection is 1° at 10 GHz.

Figure 9E:
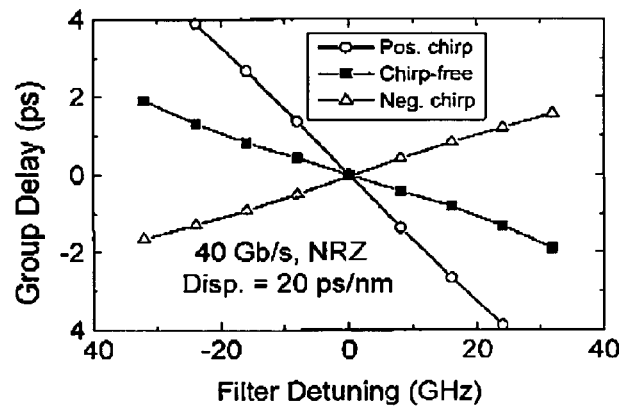

In aforementioned modeling, the transmitter generates chirp-free optical signals. The impact of transmitter chirp is illustrated in FIG. 9E under the same modeling assumptions for FIG. 9A, except that the Mach-Zender modulator may have a non-zero chirp parameter. The above schemes can actually measure an effective signal chirp induced by chromatic dispersion, self-phase modulation, and phase modulation at transmitter. Upon a proper calibration taking into account of the transmitter chirp and fiber nonlinearity, the schemes can be used for chromatic dispersion monitoring. Notably, such chromatic dispersion monitoring schemes are not influenced by first-order PMD effect.

The above chromatic dispersion monitoring techniques based on VSB filtering may be combined with a proper polarization control mechanism to monitor the polarization mode dispersion in the input signal. Such PMD monitoring schemes are capable of the monitoring both first-order PMD which is independent of optical frequency and higher-order PMD vectors which are dependent on optical frequency. The VSB filtering is used to obtain two optical signals at different optical frequency ranges. The differences between the measured PMD values obtained from the two VSB filtered optical signals are caused by the frequency-dependent higher-order PMD effects. Since the frequency difference between two VSB filtered optical signals can be determined, the higher-order PMD effects can thus be measured. In addition, such a PMD monitoring scheme may be used to provide a control signal to an adjustable PMD compensator or control element to dynamically control the PMD effect in a fiber link.

Figure 10:
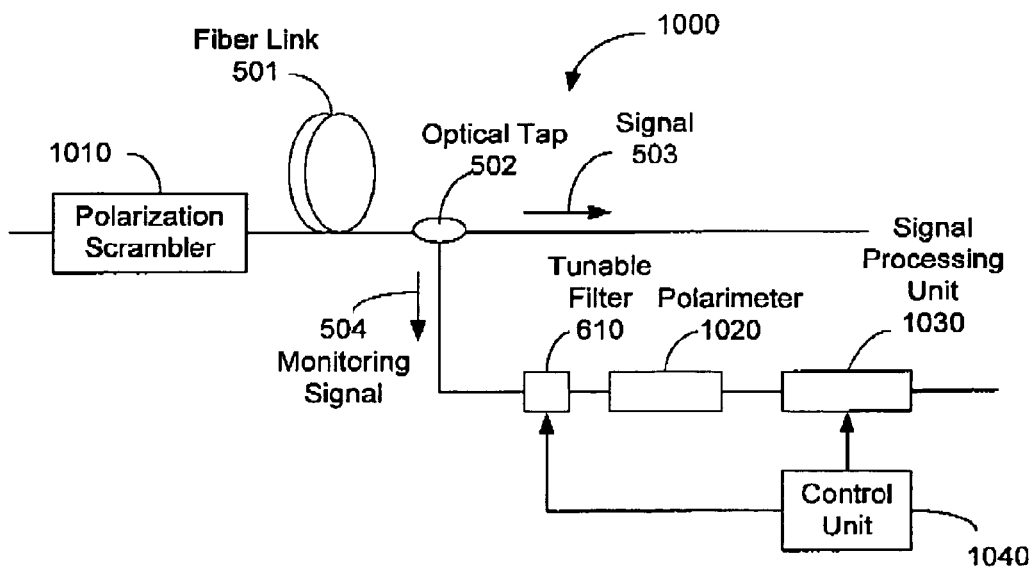
FIG. 10 shows one embodiment of a monitoring device for monitoring polarization-mode dispersion based on optical VSB filtering.

FIG. 10 shows one embodiment of a PMD monitoring design 1000 based on the VSB filtering configuration in FIG. 6A where a single tunable filter 610 is used to obtain the lower and upper VSB filtered signals. The fiber link 510 is optically birefringent to cause PMD in the optical signal. A polarization scrambler 1010 is used to scramble the polarization of the input modulated signal with sidebands so that the polarization vector of the input optical signal randomly distributes over the entire Poincare sphere which represents all states of polarization (SOP) of light. The scrambler 1010 is assumed to operate sufficiently fast to randomize the input polarization over the entire Poincare sphere in a period during which the PMD in the input signal remains substantially constant. For example, this operating time for the scrambler 1010 may be on the order of milliseconds or tens of milliseconds. Hence, the number of SOPs to be scanned through is dependent on the operating speed of scrambler 1010 and the rate of change in the PMD. The input light with the scrambled polarization is then sent through the PMD fiber link 501. At the output side of the fiber link 501, the three-dimensional degree-of polarization (DOP) vectors of the output light by the fiber link 501 may be measured as a function of time for the polarization-scrambled signal using a polarimeter 1020. The tunable filter 610 is used to filter the optical signal to obtain the upper and lower VSB signals. The filtered sideband signal is then sent into the polarimeter 1020 to measure the temporal variation of three-dimension DOP vectors over at least one polarization scrambling period. A three-dimensional plot of these DOP vectors may be used to define a polarization ellipsoid whose major axis is aligned with the principle state of polarization (PSP) of the fiber link 501. The ellipsoidal degree of the ellipsoid is determined by the differential group delay (DGD) caused by the PMD. Notably, these values of PSP and DGD are averaged over the optical spectral range of each of two VSB filtered sideband signal. The output of the polarizmeter 1020 is then sent into a signal processing unit 1030 to compute the PMD vectors $\Omega_{VSB-U}$ and $\Omega_{VSB-L}$ at the different sidebands. By definition, a PMD vector has a magnitude equal to the DGD and a direction aligned with the PSP. A control unit 1040 may be used to synchronize the operations of the tuning of the filter 610 and the signal processing in the unit 1030.

Since the lower and upper VSB filtered optical signals carry the same data information but occupy different frequency range in the optical domain, the PMD to higher-orders may be estimated in an approximation as follows:

$$[\Omega_{VSB-L}, \Omega_{VSB-U}]=[\Omega(\omega_0-\Delta\omega), \Omega(\omega_0+\Delta\omega)] \quad (1)$$

where $\omega_0$ is the angular frequency of optical carrier, $\Delta\omega$ an effective frequency shift of the center frequency of the filter from the optical carrier frequency, and as a rough estimate, $\Delta\omega \approx 2\pi \times \Delta\nu_{VSB}$ and $\Delta\nu_{VSB}$ is the bandwidth of the VSB filter 610. The effective frequency shift $\Delta\omega$ can be determined accurately from calibrations, i.e. comparing the estimated PMD vectors with the truly measured PMD vectors. The second-order PMD may be estimated with the following formulae, $$\Delta\tau = |\Omega|, q = \Omega/\Delta\tau \quad (2)$$

$$\Delta\tau_0 = \frac{\Delta\tau(\omega_0+\Delta\omega)+\Delta\tau(\omega_0-\Delta\omega)}{2} \quad (3)$$

$$q_0 = \frac{q(\omega_0+\Delta\omega)+q(\omega_0-\Delta\omega)}{2} \quad (4)$$

$$\Delta\tau' = \frac{\Delta\tau(\omega_0+\Delta\omega)-\Delta\tau(\omega_0-\Delta\omega)}{2\Delta\omega} \quad (5)$$

$$q' = \frac{q(\omega_0+\Delta\omega)-q(\omega_0-\Delta\omega)}{2\Delta\omega} \quad (6)$$

$$\Omega' = \Delta\tau' + \Delta\tau_0 q' \quad (7)$$

Hence, the device 1000 provides a mechanism to monitoring both first and second-order PMD vectors in the fiber link 501. Similarly higher-order PMD effects may also determined.

FIG. 10 shows dynamic monitoring first and higher order PMD with a sequential VSB filtering where the tunable filter 610 is tuned to one side of the optical carrier to obtain the lower VSB signal first which is processed by the unit 1030 to determine the first PMD. Next, the filter 610 is tuned to the other side of the optical carrier to obtain the upper VSB signal which is again processed by the unit 1030 to determine the second PMD. Similarly, the parallel VSB filtering shown in FIG. 5 may also be used here with two polarimeters respectively coupled to the two filters 512 and 522 to obtain the PMDs at two different frequencies in parallel.

Figure 11:
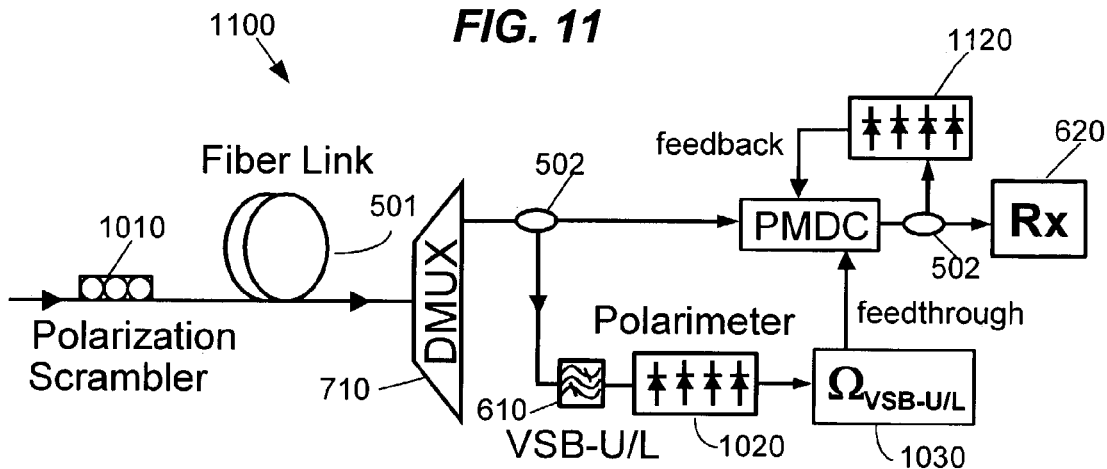
FIG. 11 shows a PMD compensation system based on the VSB PMD monitoring in FIG. 10.

FIG. 11 shows a WDM system 1100 with a dynamic PMD compensation based on the above PMD monitoring. In general, in absence of prior information of fiber PMD, it is difficult to implement higher-order PMD compensation with only feedback control because the feedback loop may settle into a local optimum state. Since the above PMD monitoring method provides information on both the first-order and second-order PMD vectors, the theoretical optimal values of the compensator parameters can be determined for compensation that includes first and second order PMD. The system 1100 implements an adjustable PMD compensator 1110 to reduce the PMD in the input signal. Two separate loops are provided to control the PMD lo compensator 1110. The first control loop is a PMD feedforward loop formed by the PMD monitoring setup shown in FIG. 10. The output of the unit 1030 is used to control the setting of the PMD compensator 1110 which is a predicted setting based on the input PMD to the PMD compensator 1110. The second control loop is a PMD feedback loop which uses another polarimeter 1120 to measure the output polarization of the PMD compensator 1110. Detected deviation of the output polarization from a desired polarization is then used to produce a feedback control signal to control the PMD compensator 1110 to reduce the deviation. A stable operation of PMD compensator can be realized by this combination of the feedforward and feedback control methods. In one implementation, the compensator parameters may be optimized by the feedback control to account for all orders of PMD, and the compensator may be reset when its parameter deviates too much from the feedforward predictions.

Figure 12:
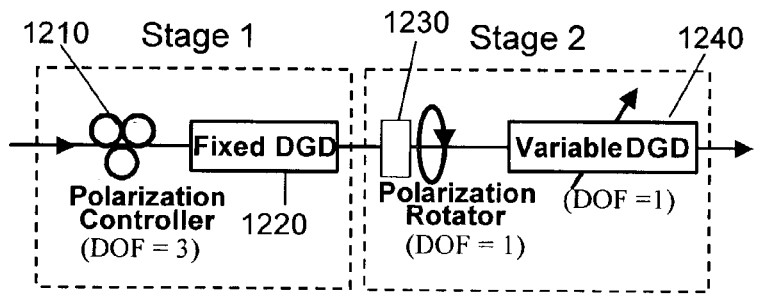
FIG. 12 shows one embodiment of a PMD compensator used in FIG. 11.

The PMD compensator 1110 may be implemented in various configurations. In general, each configuration includes multiple polarization elements. FIG. 12 shows an exemplary two-stage higher-order PMD compensator. The first stage has a polarization controller 1210 with a three degrees of freedom for control and a fixed DGD element 1220 which produces affixed differential group delay between two orthogonal polarizations. The second stage includes a polarization rotator 1230 with one degree of freedom to control the polarization of light output from the first stage and a variable DGD element 1240 with one degree of freedom for control. Hence, a total of 5 degrees of freedom are controlled by the feedback and feedforward control loops. Its compensation performance using aforementioned control strategy is modeled for 40-Gb/s NRZ transmission over a fiber with Maxwellian PMD statistics including all-order PMD. The fiber average DGD is about 11.2 ps.

Figure 13:
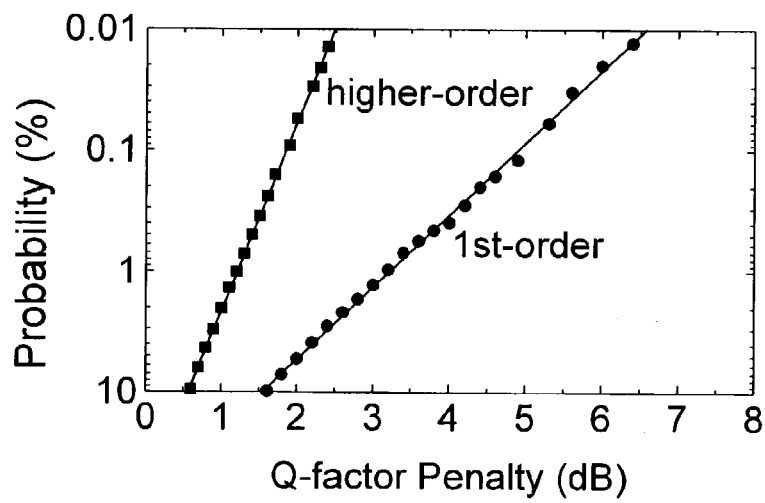
FIG. 13 shows cumulative probability distribution of PMD-induced penalty in the Q factor after PMD compensation in the system in FIG. 11.

The cumulative probability distribution of PMD induced Q-factor penalty after PMD compensation is shown in FIG. 13. As compared with a pure first-order compensator (total DGD always compensated to zero), the Q-factor penalty at 10-4 probability is dramatically reduced from 6.5 dB to 2.5 dB.

The proposed chromatic dispersion monitoring techniques have the following advantages: (i) High sensitivity, with monitoring resolution <1.5 ps/nm for NRZ and <1 ps/nm for RZ and carrier-suppressed RZ format, (ii) low cost for WDM systems because of the capability to accommodate many WDM channels, (iii) no modification of transmitters, (iv) greatly reducing the influence of PMD on chromatic dispersion monitoring, (v) applicable in the presence of fiber nonlinearity and transmitter chirp after calibration.

It is further contemplated that, the above techniques and devices that use optical VSB filtering of a modulated optical signal to obtain two filtered optical signals carrying the same information but at different optical frequency ranges may be generally used to measure any parameter or property of the system that has a dependency on frequency. Under this approach, the measurement may be achieved in three steps. First, the modulated optical signal is filtered to obtain two VSB filtered optical signals at different spectral ranges. Second, the two VSG filtered signals are measured. Third, the difference between the measurements obtained from the two different VSB signals is determined. Finally, the frequency-dependent parameter or property is extracted from the difference. The afore-described embodiments provide examples in measuring chromatic dispersion and PMD effects which are frequency dependent. These are only examples and illustrated the above widely-applicable techniques.

Only a few embodiments are disclosed. However, it is understood that variations and enhancements may be made without departing from the spirit of and are intended to be encompassed by the following claims.

What is claimed is:

1. A method for monitoring optical dispersion in a modulated optical signal produced by modulating light at an optical carrier frequency at a signal bit rate of digital bits of a digital signal to produce the first and second sidebands at opposite sides of the carrier frequency to carry the digital signal, comprising:
    optically filtering the modulated optical signal at a carrier frequency that has first and second sidebands at opposite sides of said carrier frequency with at least one optical bandpass filter centered at a frequency away from said carrier frequency less than the signal bit rate to produce a first optical signal having a first spectral range that covers said carrier frequency and said first sideband to include a first portion of a baseband signal in said modulated optical signal and a second optical signal having a second, different spectral range that covers said carrier frequency and said second sideband to include a second portion of said baseband signal in said modulated optical signal that partially overlaps with said first portion;
    measuring a parameter in the first portion of the baseband signal from said first optical signal to obtain a first result;
    measuring said parameter in the second portion of the baseband signal from said second optical signal to obtain a second result; and
    obtaining a difference between said first and said second results to extract frequency-dependent information in said modulated optical signal,
    wherein said frequency-dependent information includes optical chromatic dispersion.

2. The method as in claim 1, further comprising:
    placing a tunable optical dispersion element in an optical path of said modulated optical signal; and
    dynamically controlling optical chromatic dispersion in said modulated optical signal by adjusting said tunable optical dispersion element in response to measured optical chromatic dispersion.

3. The method as in claim 1, wherein said parameter includes an optical phase of each of said first and said second optical signals.

4. The method as in claim 3, further comprising recovering a clock signal in each optical signal and said optical phase is obtained from said clock signal.

5. The method as in claim 1, further comprising:
    making the optical bandpass filter to be centered at a frequency that is away from said carrier frequency by approximately between 30% and 80% of the bit-rate of the modulated optical signal.

6. A method for monitoring optical dispersion in a modulated optical signal produced by modulating light at an optical carrier frequency at a signal bit rate of digital bits of a digital signal to produce the first and second sidebands at opposite sides of the carrier frequency to carry the digital signal, comprising:
    optically filtering the modulated optical signal at a carrier frequency that has first and second sidebands at opposite sides of said carrier frequency with at least one optical bandpass filter centered at a frequency away from said carrier frequency less than the signal bit rate to produce a first optical signal having a first spectral range that covers said carrier frequency and said first sideband to include a first portion of a baseband signal in said modulated optical signal and a second optical signal having a second, different spectral range that covers said carrier frequency and said second sideband to include a second portion of said baseband signal in said modulated optical signal that partially overlaps with said first portion;

measuring a parameter in the first portion of the baseband signal from said first optical signal to obtain a first result;

measuring said parameter in the second portion of the baseband signal from said second optical signal to obtain a second result; and obtaining a difference between said first and said second results to extract frequency-dependent information in said modulated optical signal, wherein said frequency-dependent information includes polarization-mode dispersion which includes an effect that is frequency dependent.

7. The method as in claim 6, further comprising:

prior to transmitting said modulated optical signal through an optical medium exhibiting optical birefringence, scrambling state of polarization of said modulated optical signal;

performing said optical filtering after said modulated optical signal transmits through said optical medium;

measuring state of polarization of each of said first and said second optical signals corresponding to each polarization input to said optical medium caused by said scrambling;

determining an amount of polarization-mode dispersion of each of said first and said second optical signals; and determining frequency-dependent effects of polarization-mode dispersion from measurements of said first and said second optical signals.

8. The method as in claim 7, further comprising;

placing a tunable optical element in an optical path of said modulated optical signal to produce a variable polarization-mode dispersion; and dynamically controlling optical polarization-mode dispersion in said modulated optical signal by adjusting said tunable optical element in response to measured optical polarization-mode dispersion.

9. A method f or monitoring optical dispersion in a modulated optical signal produced by modulating light at an optical carrier frequency at a signal bit rate of digital bits of a digital signal to produce the first and second sidebands at opposite sides of the carrier frequency to carry the digital signal, comprising:

optically filtering the modulated optical signal at a carrier frequency that has first and second sidebands at opposite sides of said carrier frequency with at least one optical bandpass filter centered at a frequency away from said carrier frequency less than the signal bit rate to produce a first optical signal having a first spectral range that covers said carrier frequency and said first sideband to include a first portion of a baseband signal in said modulated optical signal and a second optical signal having a second, different spectral range that covers said carrier frequency and said second sideband to include a second portion of said baseband signal in said modulated optical signal that partially overlaps with said first portion;

measuring a parameter in the first portion of the baseband signal from said first optical signal to obtain a first result;

measuring said parameter in the second portion of the baseband signal from said second optical signal to obtain a second result;

obtaining a difference between said first and said second results to extract frequency-dependent information in said modulated optical signal;

using at least one tunable optical bandpass filter to perform said optical filtering; and tuning said tunable optical bandpass filter to wavelengths of different wavelength-division-multiplexed modulated optical signals, one at a timer to obtaining frequency-dependent information for different wavelength-division-multiplexed modulated optical signals.

10. A device for monitoring optical dispersion in a modulated optical signal produced by modulating light at an optical carrier frequency at a signal bit rate of digital bits of a digital signal to produce first and second sidebands at opposite sides of the carrier frequency to carry the digital signal, comprising:

means for filtering the modulated optical signal at a frequency greater than said carrier frequency by less than the signal bit rate to produce a first optical signal having a first spectral range that covers said carrier frequency and said first sideband to include a first portion of said modulated optical signal means for filtering the modulated optical signal at a frequency less than said carrier frequency by less than the signal bit rate to produce a second optical signal having a second, different spectral range that covers said carrier frequency and said second sideband to include a second portion of said modulated optical signal that partially overlaps with said first portion;

means for optically filtering a modulated optical signal at a carrier frequency that carries a baseband signal and has first and second sidebands at opposite sides of said carrier frequency to produce a first optical signal having a first spectral range that covers said baseband signal between said carrier frequency and said first sideband and a second optical signal having a second, different spectral range that covers said baseband signal between said carrier frequency and said second sideband;

means for measuring a parameter of said baseband signal from said first optical signal to obtain a first result and for measuring said parameter from said second optical signal to obtain a second result; and means for comparing said first and said second results to obtain a difference to extract frequency-dependent information in said modulated optical signal, wherein said means for optically filtering said modulated optical signal includes a tunable optical bandpass filter operable to change its transmission band to different spectral positions, and said device further comprising a control unit to control said tunable optical bandpass filter to one side of said carrier frequency to obtain said first optical signal and subsequently to tune said tunable optical bandpass filter to another side of said carrier frequency to obtain said second optical signal.

11. The device as in claim 10, further comprising an optical detector to convert said first and said second optical signals into first and second electrical signals, and a signal processing unit to process said first and said second electrical signals to obtain said first and said second results.

12. The device as in claim 11, wherein said signal processing unit includes a phase-sensitive detector.

13. The device as in claim 10, further comprising a clock recovery unit between said optical detector and said signal processing unit.

14. A method, comprising:

optically filtering a modulated optical signal at a carrier frequency that has first and second sidebands at opposite sides of said carrier frequency caused by optical modulation onto the carrier frequency of data at a data bit rate of digital bits of a digital signal to produce a first optical signal which spectrally covers said first sideband and said carrier frequency and frequencies greater than said carrier frequency by the data bite rate, and a second optical signal which spectrally covers said second sideband and said carrier frequency and frequencies greater than said carrier frequency by the data bite rate;

recovering a first clock signal from said first optical signal;

recovering a second clock signal from said second optical signal; and obtaining a phase difference between said first and said second clock signals to extract information on optical dispersion in said modulated optical signal.

15. The method as in claim 14, wherein said first and said second optical signals are obtained by using a tunable optical bandpass filter to filter said modulated optical signal for a first time at one side of said carrier frequency and for a second time at the opposite side of said carrier frequency.

16. A device, comprising:

a tunable optical filter tunable to change its transmission band to different spectral positions a first center frequency greater than an optical carrier frequency by less than a data bit rate of digital bits of a digital signal to filter a modulated optical signal at said carrier frequency that carries data of the digital signal at the data bit rate a baseband signal and has first and second sidebands at opposite sides of said carrier frequency to produce a first optical signal having a first spectral range that covers said carrier frequency and said first sideband, the tunable optical filer further tunable to change its transmission band to a second center frequency less than said carrier frequency by less than the data bit rate to filter the modulated optical signal to produce a second optical signal having a second, different spectral range that covers said carrier frequency and said second sideband;

a control unit to control said tunable optical bandpass filter to one side of said carrier frequency to obtain said first optical signal and subsequently to tune said tunable optical bandpass filter to another side of said carrier frequency to obtain said second optical signal; and a processing unit coupled to receive said first and said second optical signals and operable to measure a first clock signal in said baseband signal in said first optical signal and to measure a second clock signal in said baseband signal in said second optical signal, and said processing unit further operable to compare said first and said second clock signals to obtain a phase difference to extract frequency-dependent information in said modulated optical signal.

17. The device as in claim 16, wherein said processing unit includes an optical detector, and a processing circuit coupled to receive an output from said optical detector.

18. The device as in claim 16, further comprising a polarization scrambler to scramble state of polarization of said modulated optical signal and wherein said processing unit includes an optical polarimeter.

* * * * *